United States Patent
Fletcher

(10) Patent No.: US 6,394,283 B1
(45) Date of Patent: May 28, 2002

(54) MOTORCYCLE LOCKING STAND

(76) Inventor: Edward D. Fletcher, 275 Rexford Dr., Hamilton, Ontario (CA), L8W 2A6

( * ) Notice: Subject to any disclaimer, the term of this patent is extended or adjusted under 35 U.S.C. 154(b) by 0 days.

(21) Appl. No.: 09/666,926

(22) Filed: Sep. 21, 2000

Related U.S. Application Data

(63) Continuation-in-part of application No. 09/574,079, filed on May 19, 2000.

(51) Int. Cl.[7] .............................. E05B 73/00; A47F 7/00
(52) U.S. Cl. ................................ 211/5; 211/20; 70/235
(58) Field of Search ............................ 211/17, 18, 19, 211/20, 21, 22, 23, 24, 5; 70/235

(56) References Cited

U.S. PATENT DOCUMENTS

| | | | | | |
|---|---|---|---|---|---|
| 597,507 A | * | 1/1898 | McIntosh | ...................... | 211/19 |
| 597,510 A | * | 1/1898 | Piper | ............................ | 211/19 |
| 3,675,833 A | * | 7/1972 | Barr | .......................... | 224/29 R |
| 3,720,333 A | * | 3/1973 | Vaughn | ....................... | 214/450 |
| 3,739,609 A | * | 6/1973 | Kaufmann | .................... | 70/234 |
| 3,861,533 A | * | 1/1975 | Radek | .......................... | 211/20 |
| 3,863,767 A | * | 2/1975 | Garwood | ........................ | 211/5 |
| 3,881,680 A | * | 5/1975 | Lietaert, Jr. | ................. | 248/499 |
| 4,306,660 A | * | 12/1981 | Livingston | .................... | 211/20 |
| 4,352,432 A | * | 10/1982 | Smith | .......................... | 211/19 |
| 4,416,379 A | * | 11/1983 | Graber | ........................ | 211/19 |
| 5,301,817 A | * | 4/1994 | Merritt | .......................... | 211/5 |
| 5,462,398 A | * | 10/1995 | Hymer | ....................... | 414/462 |
| 5,549,231 A | * | 8/1996 | Fletcher et al. | ............. | 224/536 |
| 5,887,461 A | * | 3/1999 | Heffley | .......................... | 70/18 |
| 5,934,863 A | * | 8/1999 | Beck | .......................... | 414/538 |
| 5,988,403 A | * | 11/1999 | Robideau | ..................... | 211/20 |

* cited by examiner

*Primary Examiner*—Daniel P. Stodola
*Assistant Examiner*—Khoa Tran

(57) ABSTRACT

A motorcycle locking stand for providing a stand to which a motorcycle can be securely locked to prevent theft. The stand includes an elongated horizontal base member anchorable to an underlying surface, a U-shaped lock bar attached to and extending horizontally along both sides of the base member, and a restraining member securable at both ends to the U-shaped lock bar. As such, the wheels of a motorcycle are positionable within the base member and the restraining member is securable in association with the motorcycle such that the motorcycle is immobilized.

18 Claims, 2 Drawing Sheets

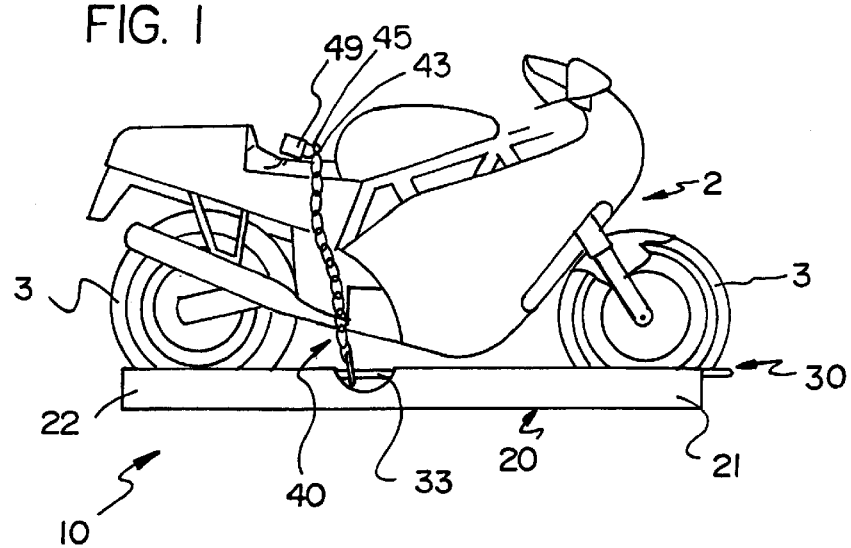
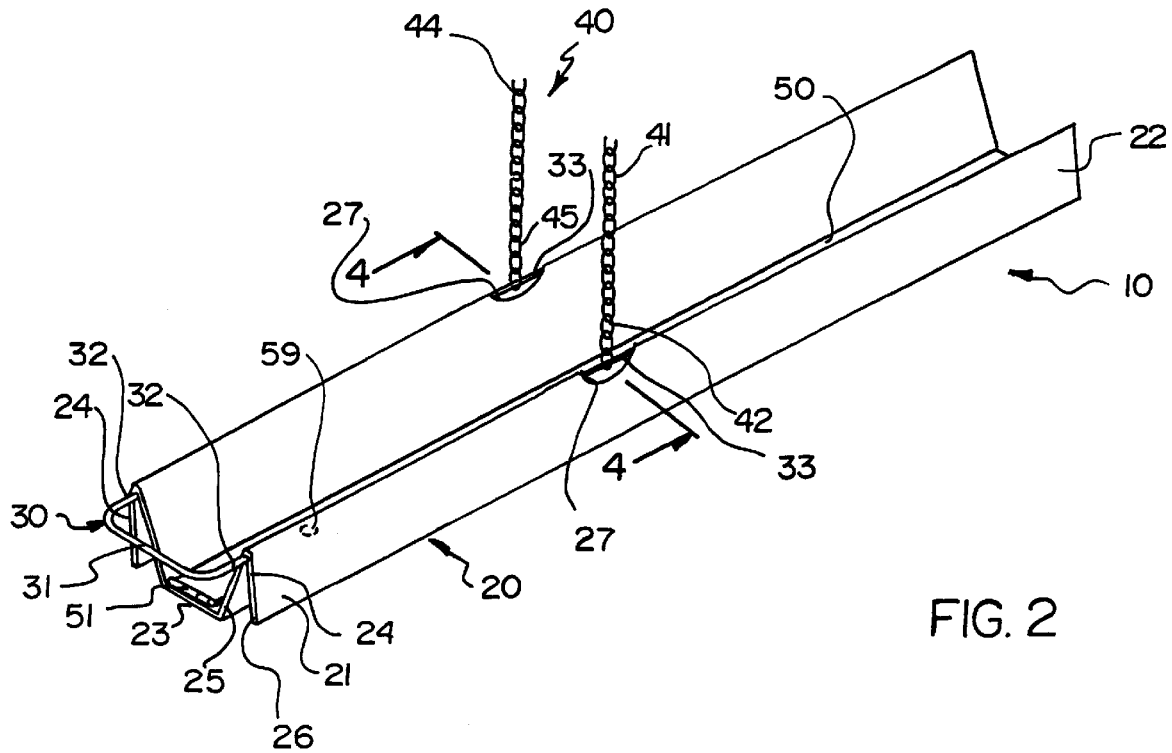

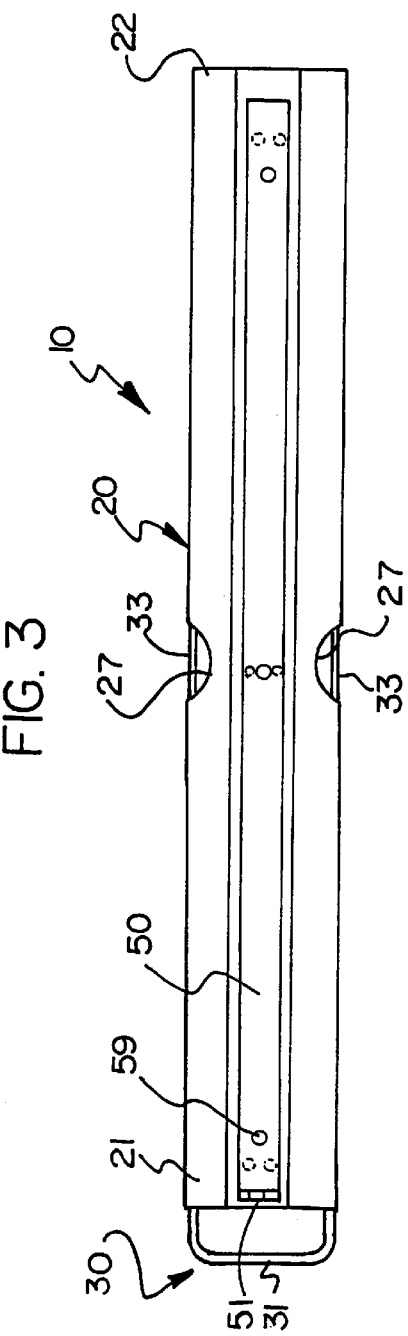
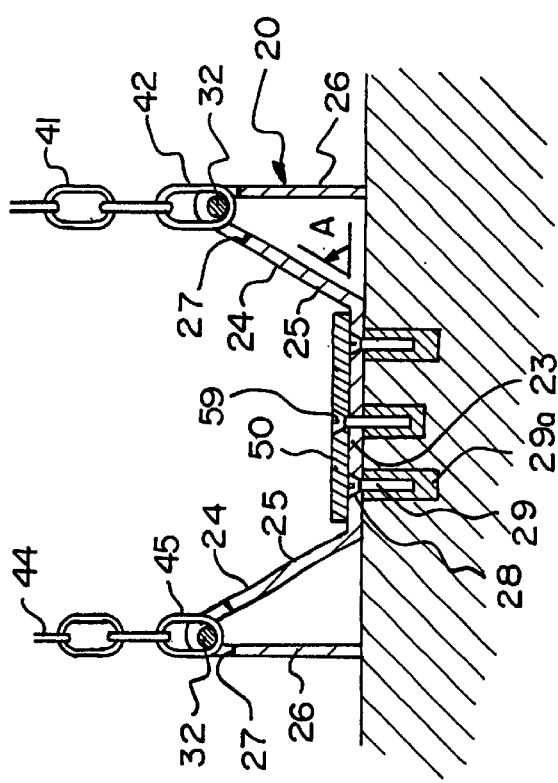

MOTORCYCLE LOCKING STAND

REFERENCE TO RELATED APPLICATION

This application is a continuation-in-part of application Ser. No. 09/574,079, filed May 19, 2000.

BACKGROUND OF THE INVENTION

1. Field of the Invention

The present invention relates to motorcycle locks and more particularly pertains to a new motorcycle locking stand for providing a stand to which a motorcycle can be securely locked to prevent theft.

2. Description of the Prior Art

The use of motorcycle locks is known in the prior art. More specifically, motorcycle locks heretofore devised and utilized are known to consist basically of familiar, expected and obvious structural configurations, notwithstanding the myriad of designs encompassed by the crowded prior art which have been developed for the fulfillment of countless objectives and requirements.

Known prior art motorcycle locks include U.S. Pat. No. 4,725,075; U.S. Pat. No. 4,182,454; U.S. Pat. No. D276,988; U.S. Pat. No. 4,298,211; U.S. Pat. No. 4,444,407 and U.S. Pat. No. 4,038,847.

While these devices fulfill their respective, particular objectives and requirements, the aforementioned patents do not disclose a new motorcycle locking stand. The inventive device includes an elongated horizontal base member anchorable to an underlying surface, a U-shaped lock bar attached to and extending horizontally along both sides of the base member, and a restraining member securable at both ends to the U-shaped lock bar. As such, the wheels of a motorcycle are positionable within the base member and the restraining member is securable in association with the motorcycle such that the motorcycle is immobilized.

In these respects, the motorcycle locking stand according to the present invention substantially departs from the conventional concepts and designs of the prior art, and in so doing provides an apparatus primarily developed for the purpose of providing a stand to which a motorcycle can be securely locked to prevent theft.

SUMMARY OF THE INVENTION

In view of the foregoing disadvantages inherent in the known types of motorcycle locks now present in the prior art, the present invention provides a new motorcycle locking stand construction wherein the same can be utilized for providing a stand to which a motorcycle can be securely locked to prevent theft.

The general purpose of the present invention, which will be described subsequently in greater detail, is to provide a new motorcycle locking stand apparatus and method which has many of the advantages of the motorcycle locks mentioned heretofore and many novel features that result in a new motorcycle locking stand which is not anticipated, rendered obvious, suggested, or even implied by any of the prior art motorcycle locks, either alone or in any combination thereof.

To attain this, the present invention generally comprises an elongated horizontal base member anchorable to an underlying surface, a U-shaped lock bar attached to and extending horizontally along both sides of the base member, and a restraining member securable at both ends to the U-shaped lock bar. As such, the wheels of a motorcycle are positionable within the base member and the restraining member is securable in association with the motorcycle such that the motorcycle is immobilized.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new motorcycle locking stand apparatus and method which has many of the advantages of the motorcycle locks mentioned heretofore and many novel features that result in a new motorcycle locking stand which is not anticipated, rendered obvious, suggested, or even implied by any of the prior art motorcycle locks, either alone or in any combination thereof.

It is another object of the present invention to provide a new motorcycle locking stand which may be easily and efficiently manufactured and marketed.

It is a further object of the present invention to provide a new motorcycle locking stand which is of a durable and reliable construction.

An even further object of the present invention is to provide a new motorcycle locking stand which is susceptible of a low cost of manufacture with regard to both materials and labor, and which accordingly is then susceptible of low prices of sale to the consuming public, thereby making such motorcycle locking stand economically available to the buying public.

Still yet another object of the present invention is to provide a new motorcycle locking stand which provides in the apparatuses and methods of the prior art some of the advantages thereof, while simultaneously overcoming some of the disadvantages normally associated therewith.

Still another object of the present invention is to provide a new motorcycle locking stand for providing a stand to which a motorcycle can be securely locked to prevent theft.

Yet another object of the present invention is to provide a new motorcycle locking stand which includes an elongated horizontal base member anchorable to an underlying surface, a U-shaped lock bar attached to and extending horizontally along both sides of the base member, and a restraining member securable at both ends to the U-shaped lock bar. As such, the wheels of a motorcycle are positionable within the base member and the restraining member is securable in association with the motorcycle such that the motorcycle is immobilized.

Still yet another object of the present invention is to provide a new motorcycle locking stand that provides multiple points to which a motorcycle can be locked.

Even still another object of the present invention is to provide a new motorcycle locking stand that provides vertical support for a motorcycle and allows for storage without having to use the kickstand of the motorcycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an illustration of a new motorcycle locking stand in use according to the present invention.

FIG. 2 is an isometric illustration of the present invention.

FIG. 3 is a top view of the present invention.

FIG. 4 is a cross sectional view taken along line 4—4 of FIG. 2.

DESCRIPTION OF THE PREFERRED EMBODIMENT

With reference now to the drawings, and in particular to FIGS. 1 through 4 thereof, a new motorcycle locking stand embodying the principles and concepts of the present invention and generally designated by the reference numeral 10 will be described.

More specifically, it will be noted that the motorcycle locking stand 10 comprises an elongated horizontal base member 20 anchorable to an underlying surface, a u-shaped lock bar 30 attached to and extending horizontally along both sides of the base member 20, and a restraining member 40 securable at both ends to the U-shaped lock bar 30. As such, the wheels 3 of a motorcycle 2 are positionable within the base member 20 and the restraining member 40 is securable in association with the motorcycle 2 such that the motorcycle 2 is immobilized.

As best illustrated in FIGS. 1 through 4, it can be shown that the elongated horizontal base member 20 includes a planar bottom portion 23 and a pair of inverted V-shaped portions 24 integrally joined to and extending along opposite sides of the planar bottom portion 23 such that the base member 20 is generally channel-shaped. As such, the base member 20 is shaped to effectively receive and guide the wheels 3 of the motorcycle 2 into position.

Each of the inverted V-shaped portions 24 include an inner wall 25 and an outer wall 26. The inner wall 25 is integrally joined to the planar bottom portion 23 and is oriented at an angle A thereto. In an illustrative embodiment, the angle A is about 60 degrees. The outer wall 26 is integrally joined to the inner wall 25 and is generally vertically oriented. Structurally, the outer wall 26 provides lateral support for the base member 20.

The base member 20 has a first end 21 and a second end 22. Each of the inverted V-shaped portions 24 has a cutout 27 therein intermediate the first end 21 and the second end 22 of the base member 20. In addition, the bottom portion 23 of the base member 20 has a plurality of holes 28 therethrough. Preferably, the plurality of holes 28 are spaced along the bottom portion 23. In an illustrative embodiment, a first pair of holes are provided adjacent the first end 21 of the base member 20, a second pair of holes are provided adjacent the second end 22 of the base member 20, and a third pair of holes are provided intermediate the first end 21 and the second end 22 of the base member 20.

The base member 20 is anchored to the underlying surface by a plurality of anchor bolts 29. Each of the anchor bolts 29 are inserted through one of the holes 28 provided in the bottom portion 23 of the base member 20. Each of the anchor bolts 29 are received by a bolt anchor 29a embedded in the underlying surface. Preferably, each of the anchor bolts 29 are countersunk into the base member 20.

A security plate 50 is secured over the bottom portion 23 of the base member 20 so as to eliminate access to the anchor bolts 29 used in anchoring the base member 20 to the underlying surface. The security plate 50 extends substantially from the first end 21 of the base member 20 to the second end 22. In a preferred embodiment, the security plate 50 is hingedly connected to the bottom portion 23 of the base member 20 at the first end 21 thereof by a hinge 51 and is secured in place by anchor bolts 59. As such, the security plate 50 cannot easily be removed and access to the anchor bolts 29 used in anchoring the base member 20 to the underlying surface is thwarted when the motorcycle 2 is positioned within the base member 20 and rests on top of the security plate 50.

The U-shaped lock bar 30 includes an end portion 31 and a pair of side portions 32 each extending from opposite ends of the end portion 31 in a spaced substantially parallel relationship. The U-shaped lock bar 30 is securely attached to the base member 20 such that the side portions 32 each extend horizontally along opposite sides of the base member 20 and such that the end portion 31 projects beyond the first end 21 of the base member 20. More specifically, one of the side portions 32 of the U-shaped lock bar 30 is positioned within one of the inverted V-shaped portions 24 of the base member 20 and the other side portion 32 of the U-shaped lock bar 30 is positioned within the other inverted V-shaped portion 24 of the base member 20.

The side portions 32 of the U-shaped lock bar 30 are of sufficient length so as to extend beyond the cutouts 27 provided in each of the inverted V-shaped portions 24 of the base member 20. As such, a lockable length 33 of each of the side portions 32 of the U-shaped lock bar 30 is accessible. In addition, the end portion 31 provides a stop for one of the wheels 3 of the motorcycle 2 when the motorcycle 2 is positioned in the base member 20.

The restraining member 40 is securable at both ends to the U-shaped lock bar 30. In a preferred embodiment, the restraining member 40 comprises a first section 41 and a second section 44 each having a first end 42 and 45, respectively, and a second end 43 and 46, respectively. As such, the first end 42 of the first section 41 is joined to the lockable length 33 of one of the side portions 32 of the U-shaped lock bar 30 and the first end 45 of the second section 44 is joined to the lockable length 33 of the other side portion 32 of the U-shaped lock bar 30. Accordingly, the second end 43 of the first section 41 and the second end 46 of the second section 44 are securely joined together with a padlock 49 or the like. In a preferred embodiment, the restraining member 40 is a chain. It is to be understood, however, that the restraining member 40 may also be a cable.

In use, a motorcycle 2 is positioned in the base member 20 such that the front wheel 3 abuts the end portion 31 of the U-shaped lock bar 30. Thereafter, the restraining member 40 is used to secure the motorcycle 2 to the base member 20. The first section 41 of the restraining member 40 and the second section 44 of the restraining member 40 are joined together such that the motorcycle 2 is immobilized. To do so, the first section 41 and the second section 44 may be inserted through the frame of the motorcycle 2 or tightly arranged over the seat of the motorcycle 2 (since the seat of a motorcycle is often a low point between the front and the rear of the motorcycle).

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A security stand for a motorcycle, comprising:

an elongated horizontal base member anchorable to an underlying surface, said elongated horizontal base member including a planar bottom portion and a pair of inverted V-shaped portions integrally joined to and extending along opposite sides of said planar bottom portion, each of said pair of inverted V-shaped portions including an inner wall and an outer wall, said inner wall being integrally joined to said planar bottom portion, a plane of said inner wall being oriented at an angle to a plane of said bottom portion, said outer wall integrally joined to said inner wall and generally vertically oriented;

a U-shaped lock bar attached to and extending horizontally along both sides of said base member, said U-shaped lock bar including an end portion and a pair of side portions each extending from opposite ends of said end portion in a spaced substantially parallel relationship, said U-shaped being attached to said base member such that a first of said pair of side portions of said U-shaped lock bar is positioned within a first of said pair of inverted V-shaped portions of said base member and a second of said pair of side portions of said U-shaped lock bar is positioned within a second of said pair of inverted V-shaped portions of said base member, whereby said pair of side portions each extend horizontally along opposite sides of said base member and said end portion projects beyond an end of said base member;

a restraining member having a pair of ends each being securable to portions of said U-shaped lock bar, whereby said motorcycle is positionable in said base member and said restraining member is securable about said motorcycle such that said motorcycle is immobilized;

each of said pair of inverted V-shaped portions of said base member has a cutout therein, said cutout provided at a union of said inner wall and said outer wall, said cutout having a first portion extending into said inner wall and a second portion extending into said outer wall, and each of said pair of side portions of said U-shaped lock bar are of sufficient length so as to extend beyond said cutout provided in each of said pair of inverted V-shaped portions of said base member, whereby a lockable length of each of said pair of side portions of said U-shaped lock bar is accessible through said cutout.

2. The security stand of claim 1, wherein said bottom portion of said base member has a plurality of holes therethrough, and further comprises:

a plurality of anchor bolts, one of said plurality of anchor bolts inserted through one of said plurality of holes in said base member, said plurality of anchor bolts anchoring said base member to an underlying surface.

3. The security stand of claim 2, further comprises:

a security plate secured to said base member over said bottom portion thereof, said security plate limiting access to said anchor bolts used to anchor said base member to said underlying surface.

4. The security stand of claim 3, wherein said security plate extends substantially from one end of said base member to another end of said base member, and wherein said security plate is hingedly connected to said bottom portion of said base member at one end thereof.

5. The security stand of claim 1, wherein said restraining member includes a first section and a second section, said first section and said second section each having a first end and a second end, said first end of said first section joined to said lockable length of a first of said pair of side portions of said U-shaped lock bar, said first end of said second section joined to said lockable length of a second of said pair of side portions of said U-shaped lock bar, securing means for removably securing said second end of said first section and said second end of said second section.

6. The security stand of claim 5, wherein said restraining member is a chain.

7. The security stand of claim 1, wherein said angle measures about 60 degrees.

8. The security stand of claim 1, wherein said end portion of said U-shaped lock bar provides a stop for a wheel of said motorcycle when said motorcycle is positioned in said base member.

9. A security stand for use in immobilizing a motorcycle with a restraining member having a first end and a second end, said security stand comprising:

an elongated horizontal base member anchorable to an underlying surface, said elongated horizontal base member including a planar bottom portion and a pair of inverted V-shaped portions integrally joined to and extending along opposite sides of said planar bottom portion, each of said pair of inverted V-shaped portions including an inner wall and an outer wall, said inner wall integrally joined to said planar bottom portion-and oriented at an angle thereto, said outer wall integrally joined to said inner wall and generally vertically oriented; and a U-shaped lock bar attached to and extending horizontally along both sides of said base member, said U-shaped lock bar including an end portion and a pair of side portions each extending from opposite ends of said end portion in a spaced substantially parallel relationship, said U-shaped lock bar attached to said base member such that a first of said pair of side portions of said U-shaped lock bar is positioned within a first of said pair of inverted V-shaped portions of said base member and a second of said pair of side portions of said U-shaped lock bar is positioned within a second of said pair of inverted V-shaped portions of said base member, said pair of side portions each extend horizontally along opposite sides of said base member and whereby said end portion projects beyond an end of said base member, each of said pair of inverted V-shaped portions of said base member having a cutout therein, said cutout provided at a union of said inner wall and said outer wall, said cutout having a first portion extending into said inner wall and a second portion extending into said outer wall, each of said pair of side portions of said U-shaped lock bar being of sufficient length so as to extend across said cutout provided in each of said pair of inverted V-shaped portions, wherein a lockable length of each of said pair of side portions of said U-shaped lock bar is accessible through said cutout, said motorcycle being positionable on said base member and securable thereto by said restraining member wherein said first end of said restraining member is securable to said lockable length of a first of said pair of side portions of said U-shaped lock bar and said second end of said restraining member is securable to said lockable length of a second of said pair of side portions of said U-shaped lock bar.

10. The security stand of claim 9, wherein said bottom portion of said base member has a plurality of holes therethrough, and further comprises:
  a plurality of anchor bolts, one of said plurality of anchor bolts inserted through one of said plurality of holes in said base member, said plurality of anchor bolts anchoring said base member to an underlying surface.

11. The security stand of claim 10, further comprises:
a security plate secured to said base member over said bottom portion thereof, said security plate limiting access to said anchor bolts used to anchor said base member to said underlying surface.

12. The security stand of claim 11, wherein said security plate extends substantially from one end of said base member to another end of said base member, and wherein said security plate is hingedly connected to said bottom portion of base member at one end thereof.

13. A security stand for a motorcycle, comprising:

an elongated base member for anchoring to an underlying surface, said base member includes a planar bottom portion and a pair of inverted V-shaped portions integrally joined to and extending along opposite sides of said planar bottom portion, each of said pair of inverted V-shaped portions includes an inner wall and an outer wall, said inner wall being integrally joined to said planar bottom portion, a plane of said inner wall being oriented at an angle to a plane of said bottom portion, said outer wall being integrally joined to said inner wall;

a U-shaped lock bar attached to and extending horizontally along both sides of said base member, said U-shaped lock bar including an end portion and a pair of side portions, each of said side portions extending from opposite ends of said end portion in a spaced and substantially parallel relationship, said U-shaped lock bar being attached to said base member in a manner such that a first of said pair of side portions of said U-shaped lock bar is positioned in a first of said pair of inverted V-shaped portions of said base member and a second of said pair of side portions of said U-shaped lock bar is positioned in a second of said pair of inverted V-shaped portions of said base member; and a restraining member for extending about the motorcycle, said restraining member having a pair of ends each being securable to portions of said U-shaped lock bar;

wherein each of said pair of inverted V-shaped portions of said base member has a cutout formed therein, said cutout being located at a juncture of said inner wall and said outer wail, said cutout having a first portion extending into said inner wall and a second portion extending into said outer wall;

wherein each of said pair of side portions of said U-shaped lock bar are of sufficient length so as to extend across said cutout provided in each of said pair of inverted V-shaped portions of said base member to thereby expose the portions of said U-shaped lock bar through said cutout.

14. The security stand of claim 13, wherein said bottom portion of said base member has a plurality of holes therethrough, and further comprises a plurality of anchor bolts for anchoring said base member to an underlying surface, each of said plurality of anchor bolts being inserted through one of said plurality of holes in said base member.

15. The security stand of claim 14, further comprising a security plate for limiting access to said anchor bolts used to anchor said base member to said underlying surface, said security plate being secured to said base member over said bottom portion thereof.

16. The security stand of claim 15, wherein said security plate extends substantially from a first end of said base member to a second end of said base member, and wherein said security plate is pivotally connected to said bottom portion of said base member at one of said ends thereof.

17. The security stand of claim 13, wherein said restraining member includes a first section and a second section, said first section and said second section each having a first end and a second end;
  said first end of said first section being joined to a first of said pair of side portions of said U-shaped lock bar at said cutout, said first end of said second section being joined to a second of said pair of side portions of said U-shaped lock bar at said cutout;
  securing means for removably securing said second end of said first section and said second end of said second section.

18. The security stand of claim 17, wherein said restraining member is a chain.

* * * * *